US011983333B2

(12) United States Patent
Scholder

(10) Patent No.: US 11,983,333 B2
(45) Date of Patent: *May 14, 2024

(54) LENS SYSTEM FOR MOUSE WITH ROBUST TOLERANCES

(71) Applicant: Logitech Europe S.A., Lausanne (CH)

(72) Inventor: François Scholder, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,193

(22) Filed: Feb. 24, 2023

(65) Prior Publication Data
US 2023/0325007 A1 Oct. 12, 2023

Related U.S. Application Data

(63) Continuation of application No. 17/872,722, filed on Jul. 25, 2022, now Pat. No. 11,620,003.

(60) Provisional application No. 63/329,758, filed on Apr. 11, 2022.

(51) Int. Cl.
G06F 3/03 (2006.01)
G06F 3/0354 (2013.01)

(52) U.S. Cl.
CPC .......... *G06F 3/0304* (2013.01); *G06F 3/0308* (2013.01); *G06F 3/0325* (2013.01); *G06F 3/03543* (2013.01)

(58) Field of Classification Search
CPC .... G06F 3/0304; G06F 3/0308; G06F 3/0325; G06F 3/03543
See application file for complete search history.

(56) References Cited

U.S. PATENT DOCUMENTS

| 7,333,083 | B1* | 2/2008 | Theytaz | G06F 3/0317 359/837 |
|---|---|---|---|---|
| 7,732,752 | B2 | 6/2010 | Mathis et al. | |
| 2004/0189593 | A1 | 9/2004 | Koay | |
| 2005/0035947 | A1 | 2/2005 | Lutian | |
| 2005/0093825 | A1 | 5/2005 | Chang et al. | |
| 2005/0231482 | A1 | 10/2005 | Theytaz et al. | |

(Continued)

OTHER PUBLICATIONS

Non-Final Office Action for U.S. Appl. No. 17/872,722, dated Oct. 14, 2022, 19 pages.

(Continued)

*Primary Examiner* — Ariel A Balaoing
(74) *Attorney, Agent, or Firm* — Kilpatrick Townsend & Stockton LLP

(57) ABSTRACT

An optical sensor system that uses focused (not collimated) light optics and produces effective tracking on a variety of surfaces while having looser manufacturing and/or operational tolerances than prior focused optics systems. Embodiments provide an optical sensor system for a mouse moveable on a surface. An LED and a light sensor are coupled to a substrate. An illumination lens directs light at a first angle to the surface, with the light focused on a focal point below the surface. An imaging lens focuses light reflected at an angle generally equal to the first angle on the light sensor. The focal point is sufficiently below the surface so that that the diameter of a produced spot of light on the surface is more than 40% larger than a field of view (FOV) of the light sensor, and less than 400% larger than the FOV of the light sensor.

20 Claims, 10 Drawing Sheets

(56) References Cited

U.S. PATENT DOCUMENTS

| | | |
|---|---|---|
| 2007/0008286 A1* | 1/2007 | Theytaz ................ G06F 3/0317 345/166 |
| 2007/0057919 A1 | 3/2007 | Ng et al. |
| 2007/0139659 A1* | 6/2007 | Hwang ................ G01B 11/002 356/614 |
| 2008/0088853 A1 | 4/2008 | Hwang et al. |
| 2008/0100936 A1 | 5/2008 | Theytaz et al. |
| 2009/0002347 A1* | 1/2009 | Ming ................ G06F 3/03543 345/182 |
| 2009/0135140 A1 | 5/2009 | Constantin et al. |
| 2021/0003853 A1 | 1/2021 | Lee et al. |
| 2022/0100288 A1 | 3/2022 | Chauvin et al. |

OTHER PUBLICATIONS

Notice of Allowance for U.S. Appl. No. 17/872,722, dated Dec. 13, 2022, 7 pages.

* cited by examiner

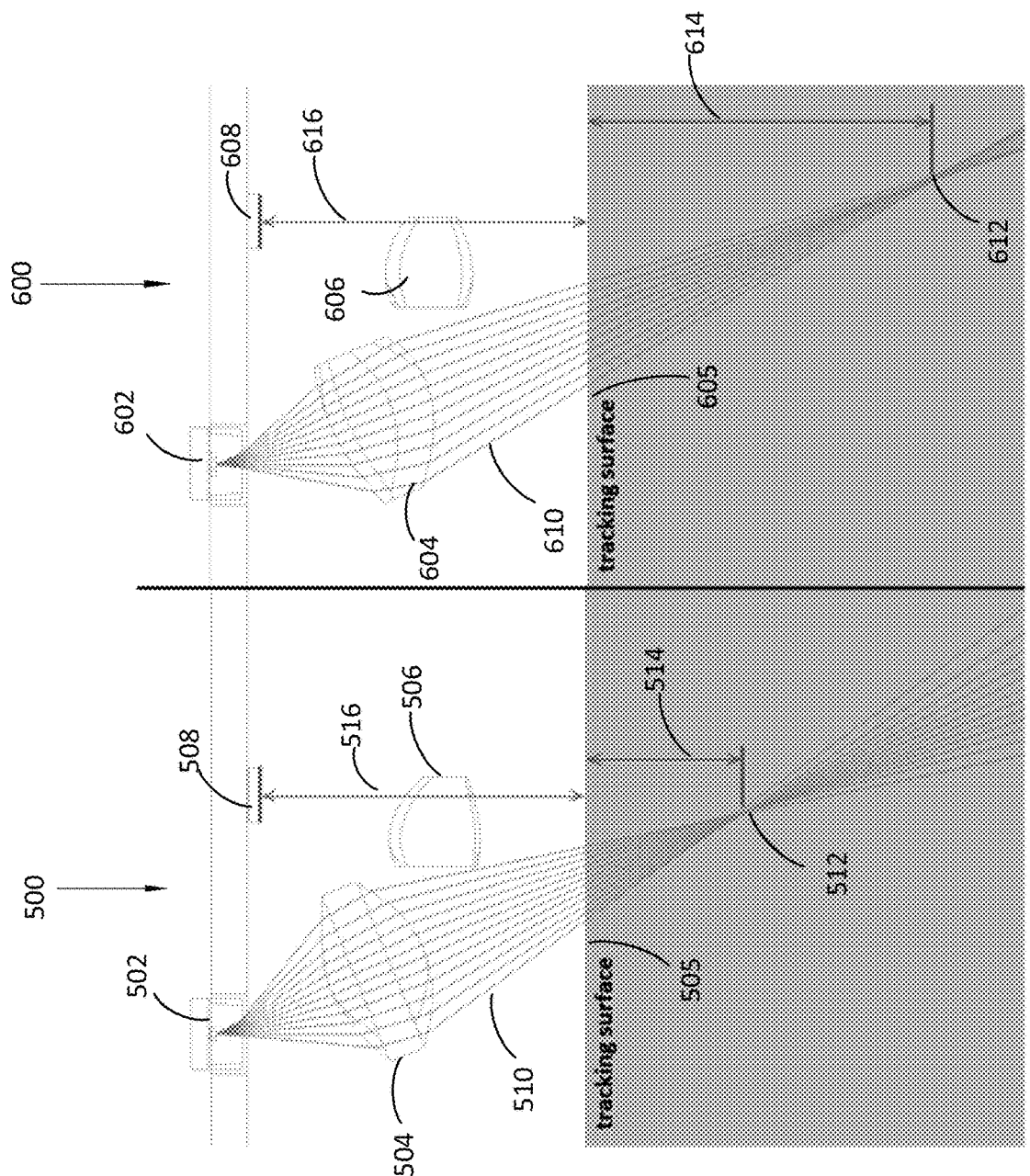

LENS SYSTEM FOR MOUSE WITH ROBUST TOLERANCES

CROSS-REFERENCES TO RELATED APPLICATIONS

This application is a continuation of U.S. Non-Provisional application Ser. No. 17/872,722, entitled "LENS SYSTEM FOR MOUSE WITH ROBUST TOLERANCES," filed on Jul. 25, 2022, which claims benefit and priority to U.S. Provisional Application No. 63/329,758 entitled "Lens System for Mouse with Robust Tolerances," filed on Apr. 11, 2022, the disclosures of which are hereby incorporated in their entirety.

BACKGROUND OF THE INVENTION

Aspects of the present disclosure relate generally to optical mice, and in particular to an optical system that produces effective optical tracking with variations in manufacturing tolerances, according to certain embodiments.

An optical mouse is a computer mouse which uses a light source, typically a light-emitting diode (LED), and a light detector, such as an array of photodetectors, to detect movement relative to a surface. The tracking of movement of an optical mouse on a surface generally works best on opaque and diffusely reflective surfaces like a mouse pad or a non-glass desk, but polished surfaces like glass are generally more challenging.

Optical mice use an optoelectronic sensor array to take successive images of the surface over which the mouse moves. In some implementations over 1000 images per second can be captured. Mouse movement is typically calculated from the differences between successive images. The technology is known as digital image correlation. Optical mice images pick up the texture in materials such as wood, mouse pads, etc. However, polished surfaces such as glass have very little texture, and thus movement is more difficult to detect.

Prior art optical mice from Logitech have used an LED with a focused light beam projected on tracking surfaces. The focused nature of the light provides very high power efficiency. However, tracking on reflective surfaces requires fairly precise manufacturing to keep the light reflected from the tracking surface in focus and aligned with the sensor array. Other makers of optical mouse sensors project collimated light onto a tracking surface, which is not focused, and thus is more robust in working with looser manufacturing tolerances. Collimated light allows tracking on reflective surfaces as well, with appropriate manufacturing tolerances. However, systems with collimated projected light create a larger spot size than focused systems, which results in less reflected light being received by the sensor array, requiring extra power and thus a shorter battery life. Also, collimated light produces errors if there is dust on the LED lens, since it will cast a shadow that is a similar size to the dust particle on the tracking surface. This shadow appears to be a stationary feature to the sensor. In addition, when used in conjunction with imaging optics, collimated lenses used in optical mice produce considerable roll off—a substantially decreased light amplitude near the edges of the sensor array-which makes tracking based on light received on the near-edge regions of the sensor array challenging.

It is desirable to have an optical mouse that can use focused light instead of collimated light, yet has a design robust enough to provide sufficient tolerance such that variations in component placement-during manufacturing and/or throughout the lifetime of the product-do not affect the ability to effectively track the movement of the mouse on a variety of surfaces, including highly reflective surfaces such as glass.

Unless otherwise indicated herein, the materials described in this section of the Specification are not prior art to the claims in this application and are not admitted to be prior art by inclusion in this section.

BRIEF SUMMARY OF THE INVENTION

Embodiments provide an optical sensor system that uses focused (not collimated) light optics and produces effective tracking on a variety of surfaces while having looser manufacturing and/or operational tolerances than prior focused optics systems.

Embodiments provide an optical sensor system for a mouse moveable on a surface. An LED and a light sensor are coupled to a substrate. An illumination lens directs light at a first angle to the surface, with the light focused on a focal point below the surface. An imaging lens focuses light reflected at an angle generally equal to the first angle onto the light sensor. The focal point of the illumination is sufficiently below the surface so that that the diameter of a produced spot of light on the surface is large enough so that, with variances in tolerances, the light spot will still be substantially within the FOV of the light sensor, yet small enough so that a substantial portion of the light is captured by the light sensor and not wasted (thus requiring less light and less drain on a battery). In particular, in embodiments the light spot is more than 40% larger than a field of view (FOV) of the light sensor, and less than 400% larger than the FOV of the light sensor.

In one embodiment, the distance from the light sensor to the surface is 7.27 mm+/−0.4 mm. A range of +/−0.4 mm around an optimum distance of 7.27 mm corresponds to the focus being at least within +/−5.5% of perfect focus.

In another embodiment, the focal point of the illumination lens is below the surface by a distance that is the same as the distance from the light sensor to the surface, plus 300% or minus 40%. In one embodiment, the focal point of the illumination lens is below the surface by a distance that is at least half the distance from the light sensor to the surface, but no more than 2 times the distance from the light sensor to the surface. In another embodiment, the illumination lens focal point is 7.5 mm.+/−1.5 mm. below the surface.

In other embodiments, the angle at which light is directed to the surface is between 20 and 25 degrees or between 22 and 24 degrees.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIG. 5 is a diagram illustrating the focal point below the surface of a prior Logitech lens;

FIG. 6 is a diagram illustrating the focal point further below the surface to provide a more robust optical system according to certain embodiments;

DETAILED DESCRIPTION OF THE INVENTION

Figure 2:
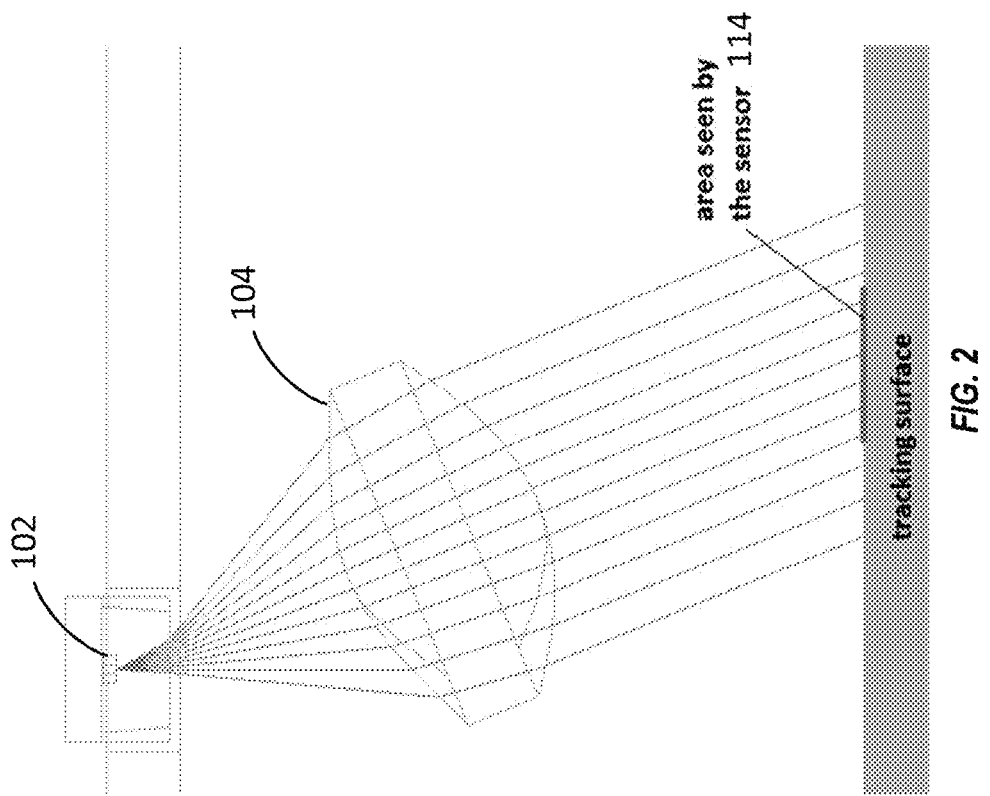
FIG. 2 is a diagram illustrating the wide area covered by a collimated lens.

Aspects of the present disclosure relate generally to optical mice, and in particular to an optical system that produces good results with variations in manufacturing tolerances, according to certain embodiments.

In the following description, various examples of an optical system are described. For purposes of explanation, specific configurations and details are set forth to provide a thorough understanding of the embodiments. However, it will be apparent to one skilled in the art that certain embodiments may be practiced or implemented without every detail disclosed. Furthermore, well-known features may be omitted or simplified to help to prevent any obfuscation of the novel features described herein.

The following high-level summary is intended to provide a basic understanding of some of the novel innovations depicted in the figures and presented in the corresponding descriptions provided below. Aspects of the invention relate to providing an optical tracking system design for a computer mouse that is robust and thus will perform well despite variances in assembly, providing wider manufacturing tolerances to reduce costs. The design allows for looser manufacturing and/or operational tolerances, while optimizing one or more of the following features:

Maximize the amount of light emitted by the light source that is collected by the illumination optics and maximize the amount of light reflected off the tracking surface that is collected by the imaging optics and focused onto the sensor array.

Maximize the uniformity of light reflected off the tracking surface that is collected by the imaging optics and focused onto the sensor array that can be used to effectively track the movement of the mouse.

Maximize the variation in working height of the imaging optics at which the light emitted by the source is collected by the imaging optics enabling effective tracking of the movement of a mouse, allowing the system to be robust to assembly tolerances and/or variations in overall mouse configuration. One cause of height variation is the wear of the "feet" which enable the mouse to move across the tracking surface.

Minimize the interference to the optical system of dust or other contamination from disrupting a light spot from being projected onto the tracking surface. In real world use, computer mice collect dust and dirt which reaches the lens, casting a shadow in the light spot.

Minimize roll-off. This means minimizing the variation in the distribution of the amount of light reaching the sensor across the sensor array.

Maximize the focus of the tracking surface as imaged onto the sensor array. Provide the sharpest image possible with minimal distortions.

Maintain the sharpness of the detected image across a wide range of working distances, allowing loose assembly tolerances in the final mouse product and variations in the mouse system.

Minimize variations in the image regardless of part tolerances (e.g., the LED die position within the LED package).

Minimize the size of the optical system.

Both the illumination and the imaging are close to vertical to minimize distortions in the optics. The physical constraint is a mechanical conflict since the light source and the sensor cannot be at the same location. Also, the angle must not be too small, otherwise when tracking on a glass surface there are stray reflections off the bottom surface of the glass that can disrupt tracking.

Aspects of the invention solve one or more of these optimization problems by increasing the focal distance of the projected light beyond that of prior art systems, while still maintaining a relatively close focal point (non-collimated). Compared to prior art focused systems, a light spot projected onto a tracking surface is increased within a certain range. This increased size enables a sufficient amount of light to be received by the light sensor within a range of variation in location and height of the optical system elements during manufacturing with looser manufacturing tolerances. This is accomplished by designing the system so that the focal point of the light from the LED is sufficiently below the tracking surface so the diameter of a produced spot of light on the surface is more than 40% larger than a field of view (FOV) of the light sensor (through the imaging lens which focuses the light onto the physical light sensor), and less than 400% larger than the FOV of the light sensor. In one embodiment the spot size is 150-300% larger than the FOV of the light sensor. In one embodiment, the light sensor FOV, corresponding to the active area of the light sensor plus some tolerance margin, is 1.2×1.2 mm, and the illumination spot size is 1.5-4 mm, or 2-3 mm. If a light sensor with a different active area is used, the illumination spot size range would change accordingly.

In embodiments, the focal distance of the illumination lens should remain short to collect as much light as possible and also to avoid casting shadows from possible dust particles or other contamination sitting on the lens. On the other hand, the spot size of the beam impinging on the tracking surface should be big enough to fully cover the field of view (FOV) of the sensor through the imaging lens, including some tolerancing in the system (especially vertical).

The focal point is below the surface by a distance that is at least half the distance from the light sensor to the surface, but no more than 5 times the distance from the light sensor to the surface. In one embodiment, the focal point is below the surface by a distance that is the same as the distance from the light sensor to the surface, plus 300% or minus 40%. An optimized configuration is to have the focal point below the tracking surface at around the same distance as the distance from that surface to the sensor array, i.e., around 7-8 mm for a sensor array sitting at about 7-8 mm above the tracking surface.

In one embodiment, the distance from the light sensor to the surface is 7.27 mm+/−0.4 mm. A range of +/−0.4 mm around an optimum distance of 7.27 mm corresponds to the focus being at least within +/−5.5% of perfect focus.

In other embodiments, the angle at which light is directed to the surface is made closer to vertical, within limits of the size of commercially available LEDs and light sensor arrays, but without the angle being so small that stray reflections off the bottom surface of a glass tracking surface are received (when tracking on glass, some projected light will reflect off of the top surface of the glass and some will enter the glass and reflect off of the bottom surface, return through the glass, and reemerge through the top surface). The inventors have determined that in embodiments the optimum angle is between 20 and 25 degrees or between 22 and 24 degrees, and more particularly, around 23 degrees.

In embodiments, in order to achieve both effective light collection and effective illumination uniformity on the light sensor array, the optical system is designed in such a way that the light coming from the illumination lens impinges the tracking surface at the same angles as the average light paths collected by the imaging lens. This specular configuration (reflected angles≈incident angles) is optimal to avoid wasting light, for two reasons. (1) Since the illumination light beam is focused, more light is collected from the light source than the more traditional collimated illumination optics. (2) The light reflected or scattered off the tracking surface is optimally collected by the imaging optics, particularly on glossy surfaces.

In embodiments, increased manufacturing tolerances are achieved in combination with other design features. The LED and light sensor are mounted on the same substrate. This allows more forgiving alignment tolerances between the light source and the lens. Thus, mounting height variations of the substrate equally affect the LED and sensor. Since the same incidence and reflection angles are used, the effect of changes in height of the substrate are canceled out. Also, all of the lenses are formed in an integrated plastic lens structure. Thus, variations in the mounting height of the plastic lens structure equally affect the projection and imaging lenses.

In embodiments, a small LED is used to allow it to be located closer to the light sensor array. A SMD (Surface Mounted Device) LED or COB (Chip on Board) LED die is used in embodiments. In one embodiment, the LED is an infrared (IR) LED. IR light is agnostic to the color of the tracking surface, and thus does not have the same variations as other light frequencies depending on the color of the tracking surface.

Other examples, embodiments, modifications, etc., are possible and some are described in further detail below.

It is to be understood that this high-level summary is presented to provide the reader with a baseline understanding of some of the novel aspects of the present disclosure and a roadmap to the details that follow. This high-level summary in no way limits the scope of the various embodiments described throughout the detailed description and each of the figures referenced above are further described below in greater detail and in their proper scope.

Collimated Lens Disadvantages

Figure 1:
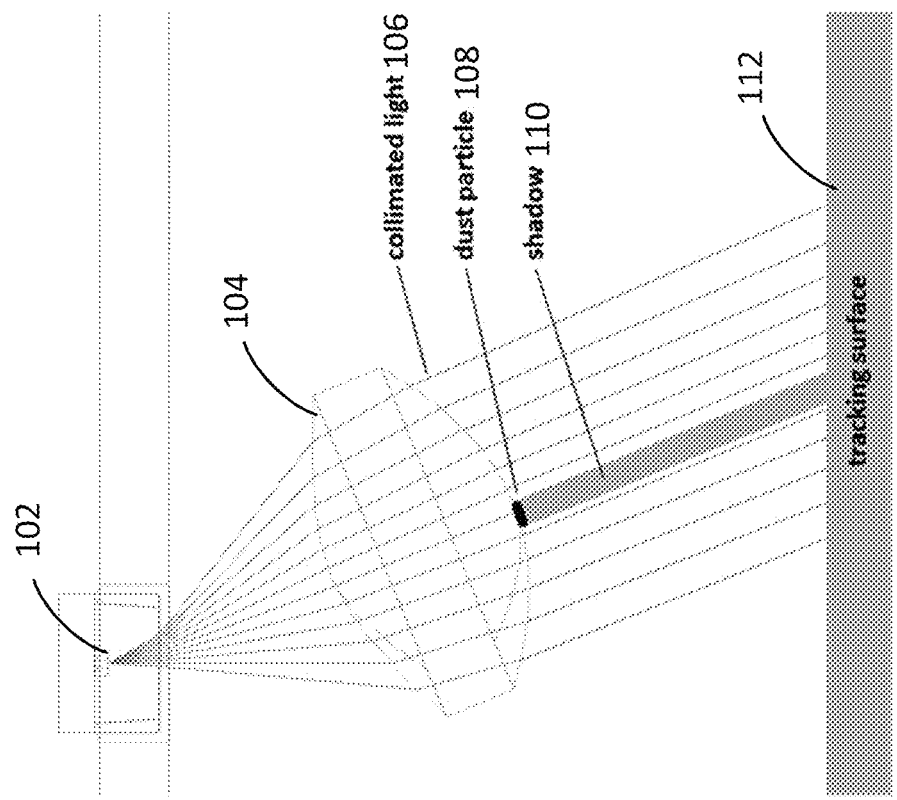
FIG. 1 is a diagram illustrating the shadow effect of lens dust on a collimated lens.

FIG. 1 is a diagram illustrating the shadow effect of lens dust on a collimated lens. An LED 102 projects a diverging light beam onto a collimating lens 104 to produce a collimated beam of light 106. A dust particle 108 casts a shadow 110 on a tracking surface 112 at least as large as the dust particle (and larger as the angle of incidence on the tracking surface increases).

That shadow will be reflected back up to a light sensor, and will stay in the same location as observed by the light sensor as the mouse moves, giving the appearance that the mouse is not moving (since that very significant apparent surface feature observed by the light sensor is appearing not to move). If a focusing lens is used instead (see FIG. 3), the lens will cause the light rays to angle inward, so that light on either side of the dust particle will at least partially reach the area that is a shadow in FIG. 1, minimizing and/or reducing the interference of dust and other contamination of the projection optical system.

FIG. 2 is a diagram illustrating the wide area covered by a collimated lens. An area 114 is the portion of the illuminated surface in the field of view (FOV) of the sensor. The benefit of the collimated lens is that the area illuminated by the light beam is large relative to the observable area seen by the light sensor, so that the alignment and/or orientation of the light sensor does not require tight design and/or manufacturing tolerances, allowing for lower cost manufacturing. A significant disadvantage is that more power is needed to sufficiently illuminate the large area, resulting in shorter battery life and/or reduced operational efficiency.

Figure 3:
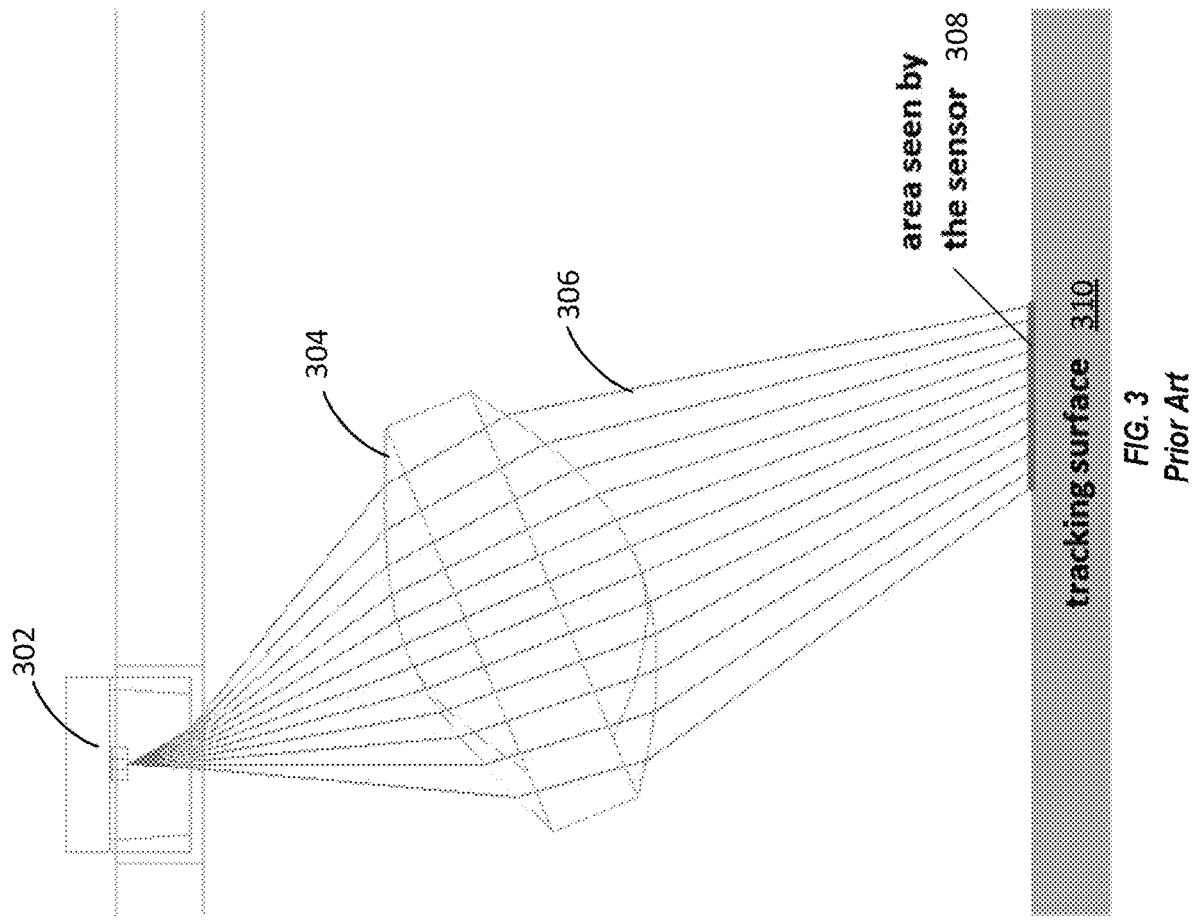
FIG. 3 is a diagram illustrating the narrower area covered by a focused lens.

FIG. 3 is a diagram illustrating the narrower area on a tracking surface covered by a focused lens. An LED 302 emits a diverging beam of light to a focusing lens 304, which causes the light beam 306 to narrow to an area 308 seen by a sensor on tracking surface 310. The focal point is below tracking surface 310, so that the light beam narrows, but is still large enough to cover the active area of the sensor. Since all of the light is directed to the sensor (if correctly aligned with tight tolerances), less power is needed to provide sufficient light to the sensor as compared to a collimated lens system, lengthening the battery life of the mouse and/or improving the efficiency. Also, as discussed earlier, since the light rays angle inward, any dust particles on the lens 304 will have no shadow or a reduced shadow, since light angles around the sides of the dust particle to illuminate the area that would be in a shadow with a collimated beam.

Figure 4:
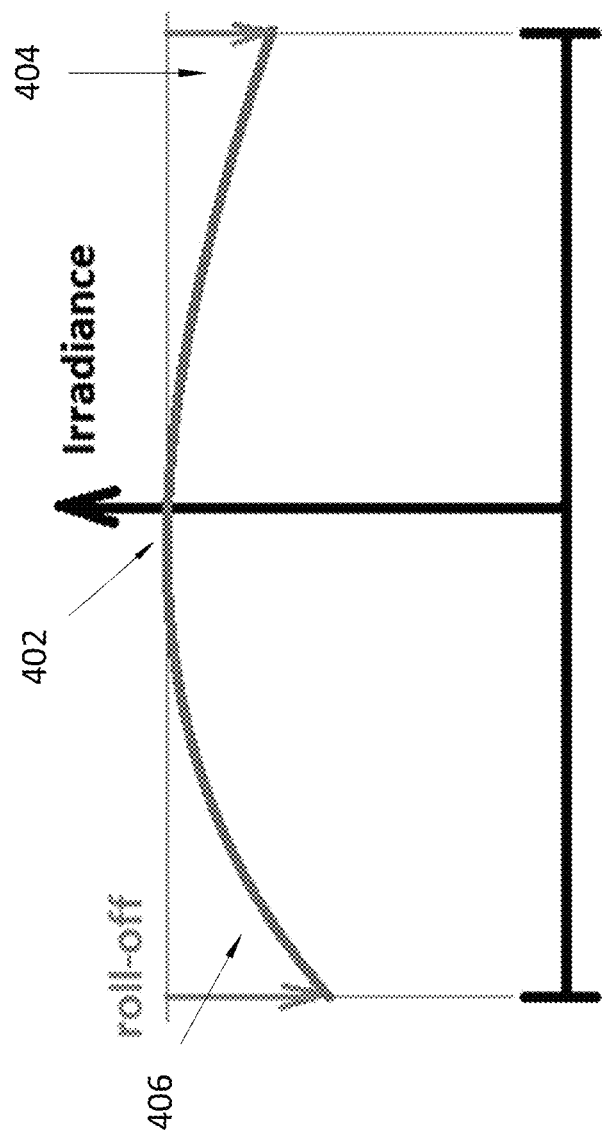
FIG. 4 is a diagram illustrating the irradiance roll-off effect on light detected by a sensor.

FIG. 4 is a diagram illustrating the irradiance roll-off effect on light detected by a sensor. Due to various factors, the intensity of light near the middle of a sensor is higher than the edges. Light directed at the middle can be reflected at different angles yet still reach part of the sensor. Light directed near the borders of the sensor will be outside the sensor FOV if the reflection varies even slightly. This roll-off is defined as the worst relative irradiance drop over the sensor array relative to the maximum irradiance. Where there is more roll-off there is a worse signal-to-noise ratio (SNR). The maximum irradiance is typically found close to the center 402 of the array and the worst drop is usually in the edges 404 and 406 and even worse in the corners of a rectangular array. The roll-off is due to multiple factors such as non-uniformity of the light from the LED source, illumination lens non-uniformity in redirecting light, the type of tracking surface (diffuse or specular) and the imaging lens.

FIG. 5 is a diagram illustrating the focal point below the tracking surface of a prior Logitech optical system 500. An LED 502 emits a diverging beam to a focusing lens 504. A beam spot on tracking surface 505 is reflected to a lens 506, which focuses the reflected light on a pixel array of a light sensor 508. The focal point 512 of beam 510 is below the surface of tracking surface 505. As can be seen, the distance 514 of focal point 512 below the tracking surface is about half the distance 516 between the tracking surface and the sensor 508. This results in a beam spot about the size of the pixel array of sensor 508, This requires tight tolerances to maintain the beam spot on the pixel array.

FIG. 6 is a diagram illustrating the focal point further below the surface to provide a more robust optical system according to certain embodiments. An LED 602 emits a diverging beam to an illumination lens 604. A beam spot on tracking surface 605 is reflected to an imaging lens 606, which focuses the reflected light on a pixel array of a light sensor 608. The focal point 612 of beam 610 is below the surface of tracking surface 605. As can be seen, the distance 614 of focal point 612 below the tracking surface is about the same as the distance 616 between the tracking surface and the light sensor 608. This results in a beam spot larger than the size of the pixel array of sensor 608. This allows looser tolerances (such as alignment, angles, and distances), and/or increased design flexibility (such as mice feet which wear and reduce in height over time) to maintain a significant portion of the beam spot on the light sensor. In other embodiments, lens 604 can be a single lens or multiple lenses, and imaging lens 606 can be a single lens or multiple lenses. Lens 604 and 606 can be integrated into a single piece of plastic, glass or other material.

Figure 7:
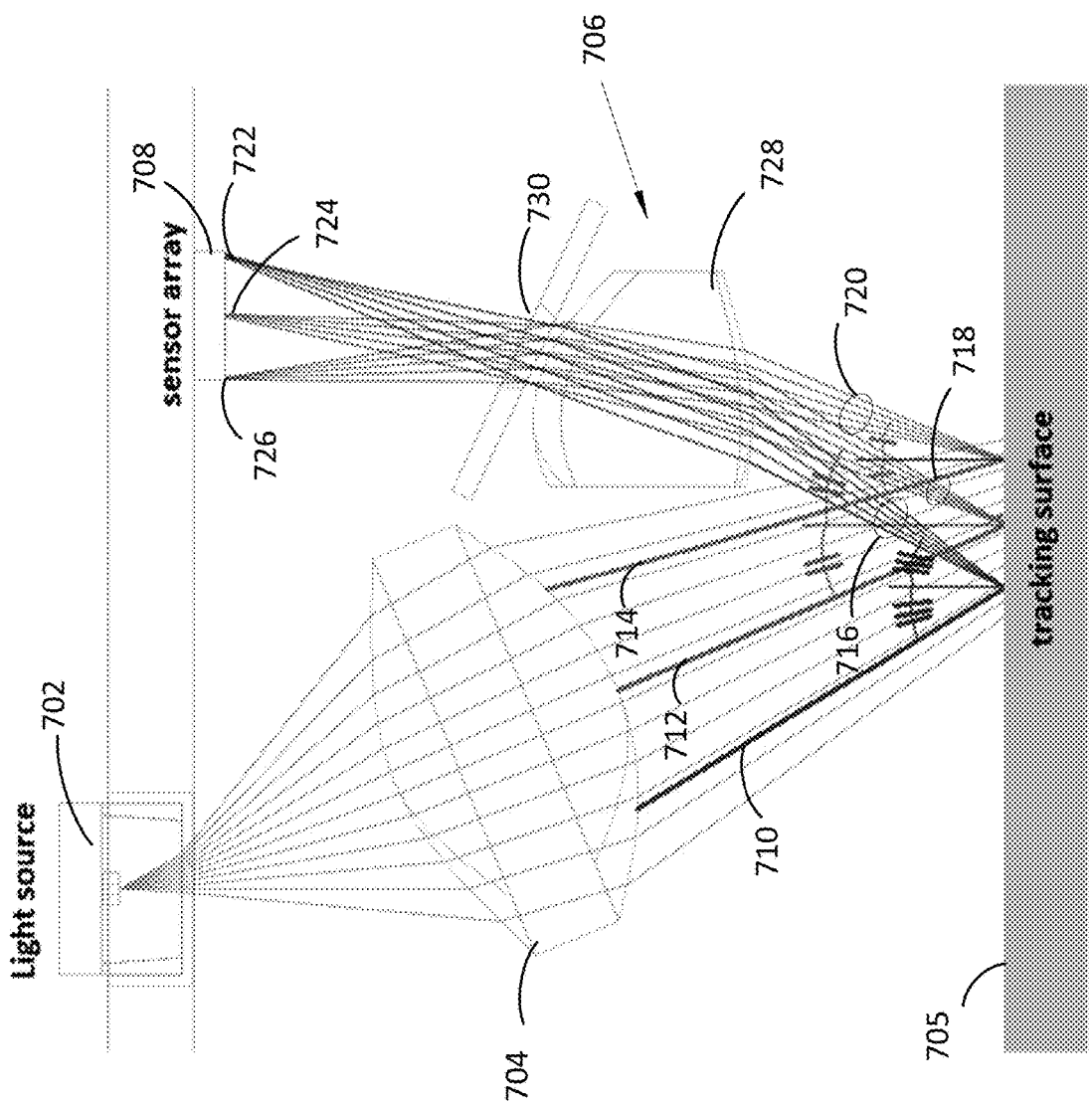
FIG. 7 is a diagram illustrating light ray tracing for a robust optical system according to certain embodiments.

FIG. 7 is a diagram illustrating light ray tracing for a robust optical system according to certain embodiments. An LED 702 emits a diverging beam to an illumination lens 704. A beam spot on tracking surface 705 is reflected to an imaging lens 706, which focuses the reflected light on a pixel array of a light sensor 708. Ray tracing of three light rays 710, 712 and 714 is shown. After reflection, ray 710 diverges as a group of rays 716, at an angle of departure equal to the angle of incidence. Similarly, after reflection, ray 712 diverges as a group of rays 718 and ray 714 diverges as a group of rays 720. The groups of rays are refocused by lens 706 on sensor array 708. Group 716 is focused to spot 722, group 718 is focused to spot 724 and group 720 is focused to spot 726. Spots 722 and 726 are at the edges of sensory array 708. As can be seen, rays 710 and 714 have other rays outside of them, thus those rays, upon reflection, will be outside the FOV of sensor array 708. However, with slight misalignment, for example due to manufacturing tolerances, some of the rays outside rays 710 and 714 will reach sensor array 708 as the beam spot on tracking surface 705 shifts relative to what is observed by the light sensor.

Figure 8:
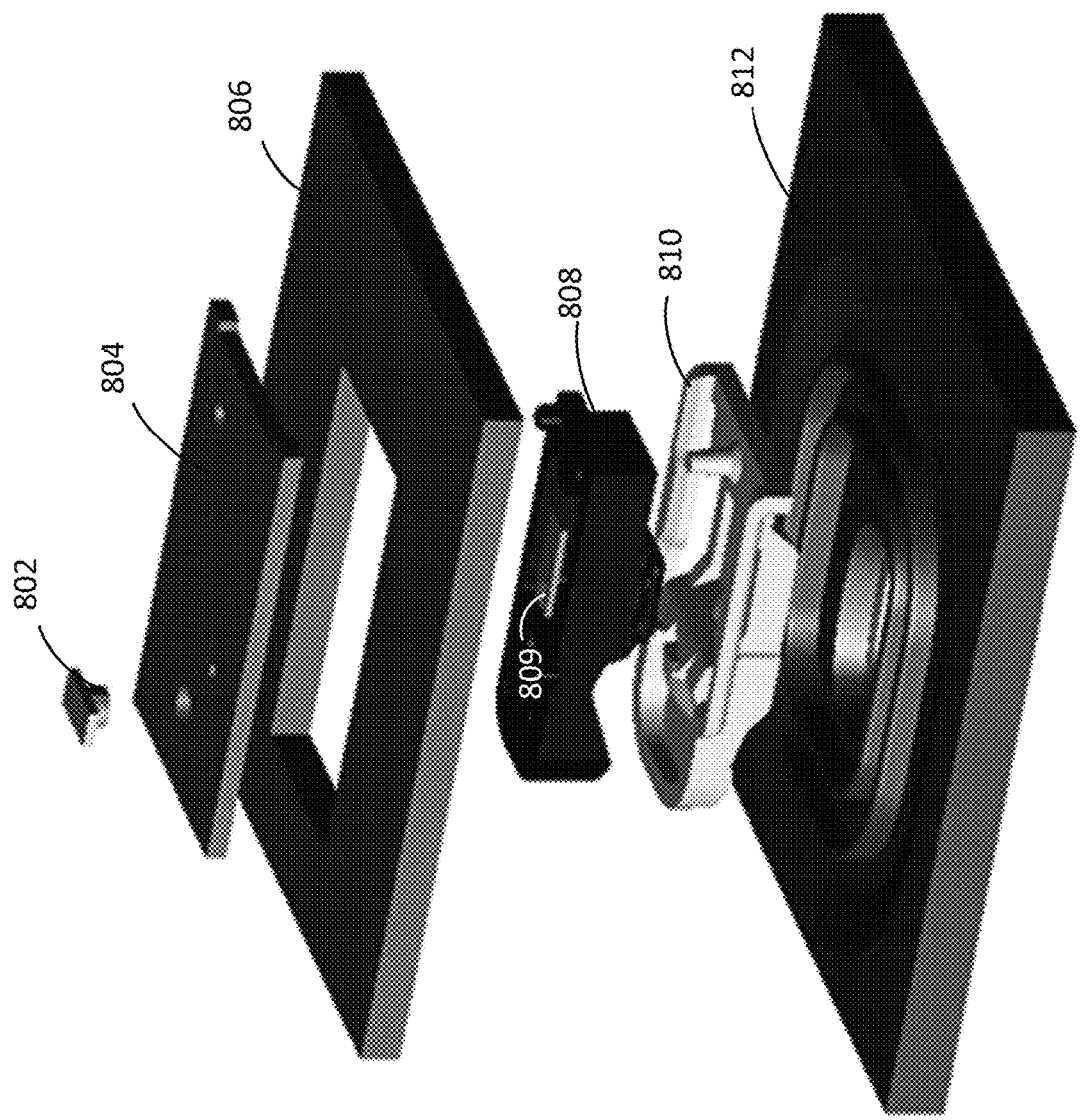
FIG. 8 is an exploded view of a robust optical structure according to certain embodiments.

FIG. 8 is an exploded view of a robust optical structure according to certain embodiments. An LED 802 is mounted to fit in a hole of castellated printed circuit board (PCB) 804. LED 802 is an SMD (Surface Mounted Diode) in a T-shaped package, with the pin connections on top and the LED die on the bottom. It is inserted through the hole in the castellated PCB so that the bottom portion is near the bottom surface of the castellated PCB. A castellated PCB has holes, in particular for the LED in this embodiment. Castellated PCB 804 covers a hole in main PCB 806. A light sensor integrated circuit (IC) 809 is attached to the bottom of castellated PCB 804. Light sensor 809 can be a surface mounted chip (SMC) or a chip on board (COB) sensor. A plastic lens 810 is a single integrated lens system that includes illumination lens 704 and imaging lens 728 of FIG. 7. A black plastic cover 808 covers the IC 809 and holds the lens 810). Aperture 730 is included in the opaque plastic cover 808. Aperture 730 is the aperture stop of the imaging lens 728. It is large enough to let through the spot of reflected light, while blocking other stray light that would interfere with the image (noise). Finally, this whole structure is mounted on a mouse bottom case 812 with an opening exposing the LED, lenses and light sensor to a tracking surface below.

FIG. 8 is just one embodiment, and various other structures could be used. For example, instead of a T-shaped LED package inserted through a hole in the PCB, a bare LED die could be attached to the bottom of the PCB, with gold bonding of its pin pads to conducting traces and/or through holes on the PCB. However, getting the LED at exactly the same height is not necessary with the LED being connected to the same main PCB as the light sensor, and with the lens system designed for the slight difference in height.

Figure 9:
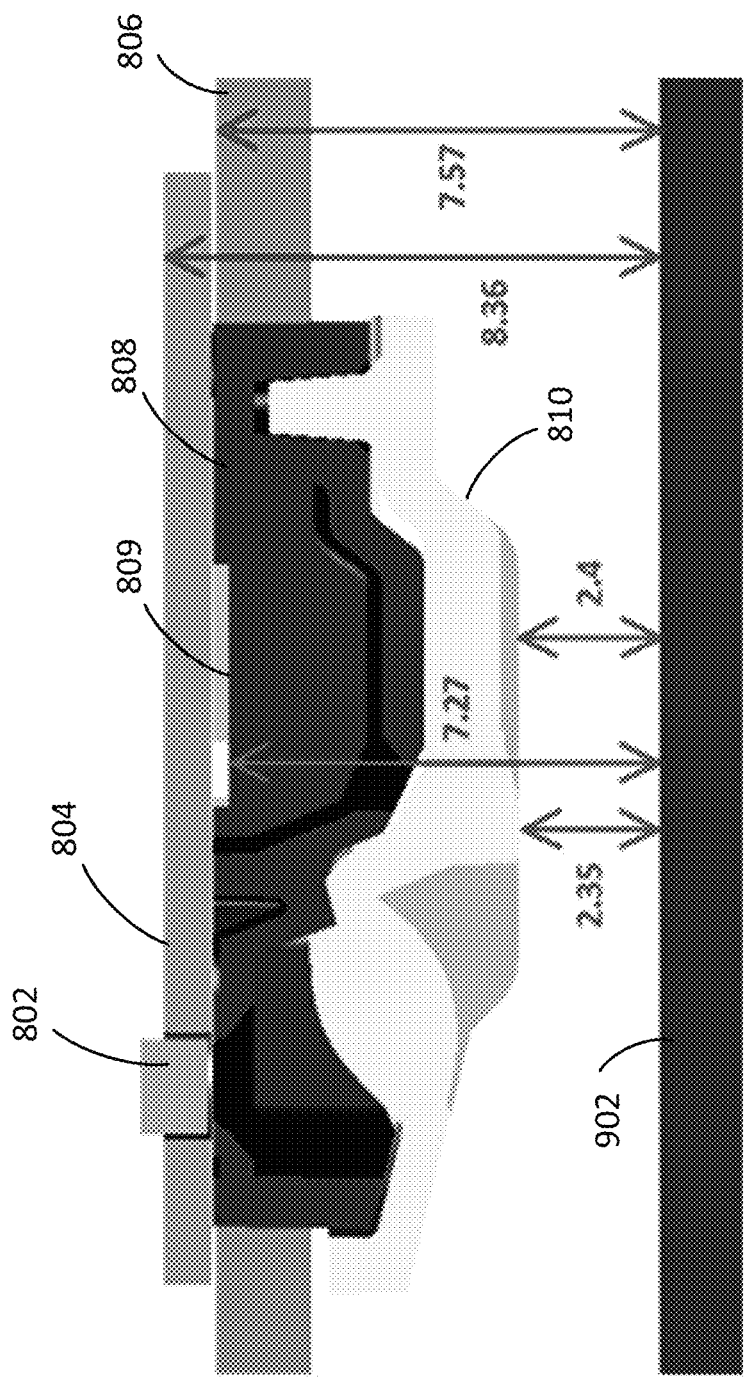
FIG. 9 is a view of an assembled robust optical structure according to certain embodiments.

FIG. 9 is a view of an assembled robust optical structure according to certain embodiments. The elements of the structure are those shown in FIG. 8, with the distances to the tracking surface 902 shown. The portion of lens structure 810 where the reflected beam re-enters the lens structure on its way to the sensor is 2.35 mm above the tracking surface. The light sensor 809 is 7.27 mm above the tracking surface 902. The top of castellated PCB 804 is 8.36 mm above tracking surface 902, and the top of main PCB 806 is 7.57 mm above tracking surface 902. These distances are optimum distances, with any one of them having tolerances for different distances. Since the lens structure is an integrated piece of plastic, the two dimensions to the tracking surface will change linearly, in unison.

Embodiments provide a larger working range than the prior Logitech focused design. Very good illumination uniformity on a glass surface is provided (very limited roll-off). A 1:1 magnification imaging lens is used. Performance is not adversely affected by reflections off the bottom surface of a 4 mm (or thicker) glass plate. This is achieved by the proper illumination angle. The angle cannot be too small, as reflections would be observed from the bottom surface of the glass (opposite the tracking surface). Very good dust/dirt immunity is provided. Due to factors such as the uniformity of the light, and smaller spot size than a collimated system, the efficiency of embodiments is better than that of collimated lighting systems.

Figure 10:
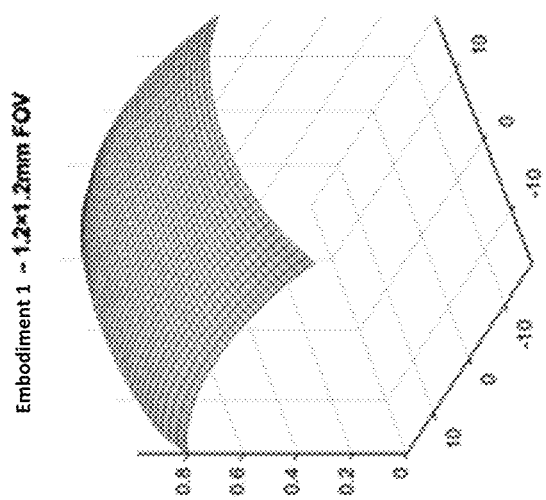
FIGS. 10-11 are illustrations of irradiance roll-off for two versions of a robust optical system according to certain embodiments.
Figure 11:
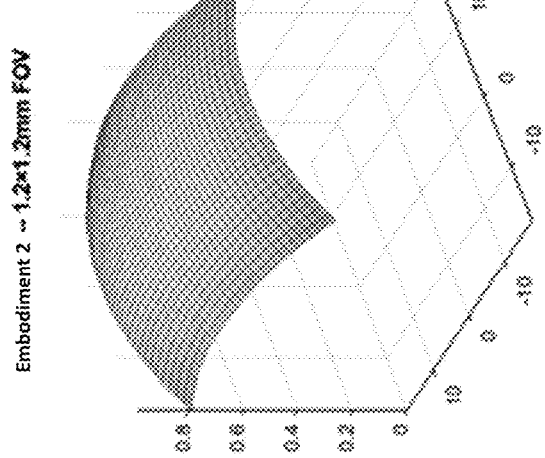

Embodiments provide a positive trade-off between the desired features:
1. sharp imaging lens,
2. decent uniformity of the light reaching the sensor array,
3. robustness to height variations within typical assembly tolerances of computer mice,
4. robustness to dust/dirt on the optical surfaces, FIGS. 10-11 are illustrations of irradiance roll-off for two versions of a robust optical system according to certain embodiments. FIG. 10 is for a first embodiment 1 and FIG. 11 is for a second embodiment 2. The roll-off for embodiment 1 is 20-25%, while embodiment 2, shown in FIG. 11, has a roll-off of 25-30% (using a 1.2×1.2 mm sensor FOV as reference). A roll-off less than 40% is provided in both embodiments. However, although the embodiment 2 roll off is more, it is still within an acceptable range, and it has other characteristics that provide a good overall solution, as shown in Table 1 below. Table 1 compares the prior Logitech focused design with tight tolerances to the first embodiment shown in FIG. 10 and the second embodiment shown in FIG. 11. The dimensions for Table 1 are for use with a sensor having an active area of 1.2×1.2 mm.

TABLE 1

| Lens[1] | Prior Logitech | Embodiment 1 | Embodiment 2 |
|---|---|---|---|
| Incidence angle | 25° | 23° | 23° |
| Illumination | Strongly focused | Focused | Focused |
| Magnification | 1 | 1 | 1 |
| Illumination spot size | Ø 1.4 mm | Ø 2 mm | Ø 3 mm |
| Irradiance on the sensor array[2] | 20 W/m$^2$ | 11 W/m$^2$ | 11 W/m$^2$ |
| Rolloff | Big (60%) | Small (20-25%) | Medium (25-30%) |
| Immunity to dust | Very good | Good | OK |
| Working range | Bad (0.3 mm) | Limited (0.4 mm) | Limited (0.5 mm) |

[1]For reference, all lenses in this table share the same LED as light source.
[2]Peak irradiance, simulated with a 15 mW LED driven at 20 mA, over a glass surface.

As can be seen from Table 1, embodiment 1 has an illumination spot size of 2 mm which is smaller than the embodiment 2 spot size of 3 mm. That results in better roll off and immunity to dust. However, a smaller spot size means it is less robust to variances in manufacturing tolerances.

Figure 12:
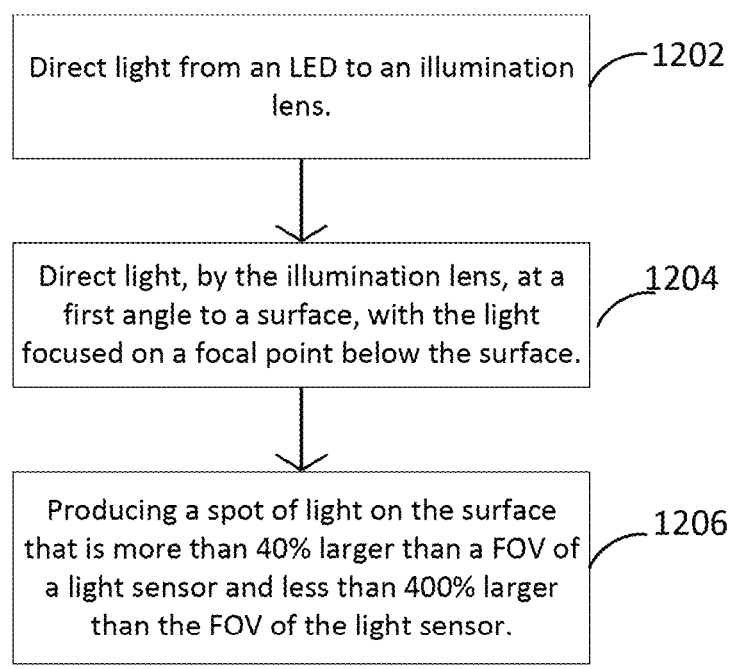
FIGS. 12-13 are flow charts of mouse LED light imaging according to certain embodiments.

FIG. 12 is a flow chart of mouse LED light imaging according to certain embodiments. Light from a mouse LED is directed to an illumination lens (step 1202). The light is directed, by the illumination lens, at a first angle to a surface. The light is focused on a focal point below the surface (1204). A spot of light is produced on the surface that is more than 40% larger than a FOV of a light sensor and less than 400% larger than the FOV of the light sensor (1206).

Figure 13:
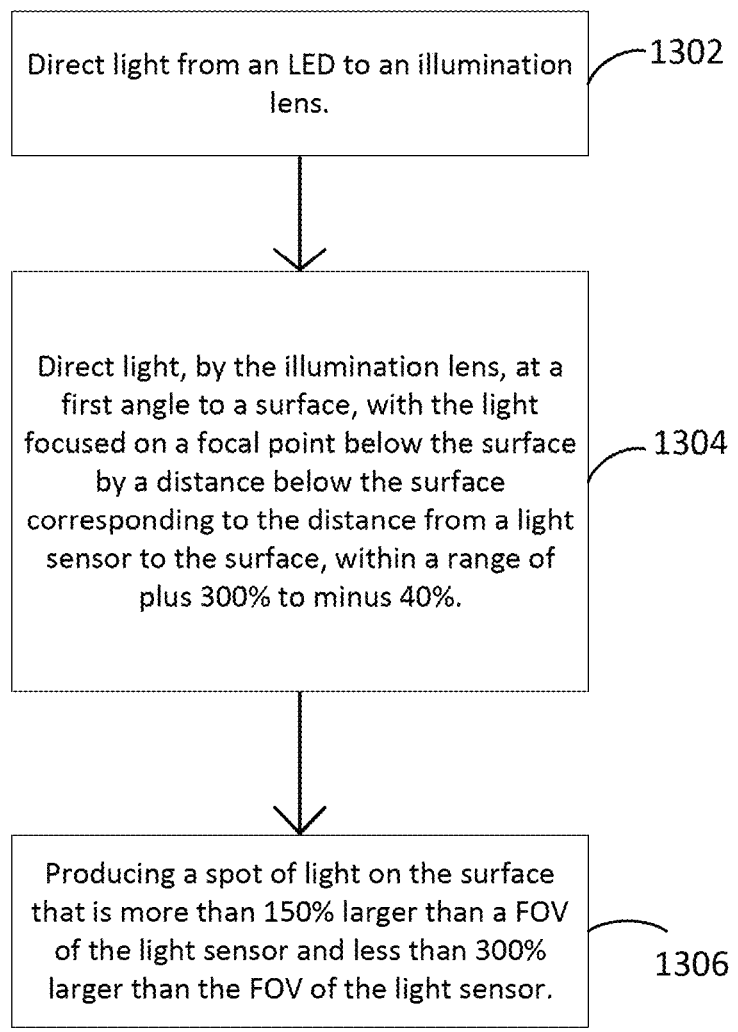

FIG. 13 is a flow chart of mouse LED light imaging according to certain embodiments. Light from a mouse LED is directed to an illumination lens (step 1302). The light is directed, by the illumination lens, at a first angle to a surface. The light is focused on a focal point below the surface by a distance below the surface corresponding to the distance from a light sensor to the surface, within a range of plus 300% to minus 40% (1304). A spot of light is produced on the surface that is more than 150% larger than a FOV of a light sensor and less than 300% larger than the FOV of the light sensor (1306).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

What is claimed is:

1. An optical sensor for a mouse moveable on a surface, comprising:
   a printed circuit board (PCB);
   an LED mounted on the PCB;

a light sensor mounted on the PCB;
an illumination lens for directing light at a first angle to the surface, with the light focused on a focal point below the surface, such that the diameter of a produced spot of light on the surface is more than 150% larger than a field of view (FOV) of the light sensor;
wherein the focal point is below the surface by a distance that is the same as the distance from the light sensor to the surface, within a range of plus 300% to minus 40%;
wherein the first angle is 25 degrees or less; and
an imaging lens for focusing light reflected at the first angle on the light sensor.

2. The optical sensor of claim 1 wherein a distance from the light sensor to the surface is 7.27 mm+/−0.4 mm.

3. The optical sensor of claim 1 wherein a second angle of the light reflected from the surface towards the light sensor is generally equal to the first angle.

4. The optical sensor of claim 1 wherein the focal point is 7.5 mm.+/−1.5 mm. below the surface.

5. The optical sensor of claim 1 wherein an irradiance roll-off on the light sensor is no more than 40%.

6. An optical sensor for a mouse moveable on a surface, comprising:
a substrate:
an LED coupled to the substrate;
a light sensor coupled to the substrate;
an imaging lens for focusing light reflected from the surface on the light sensor; and
an illumination lens for directing light from the LED at a first angle to the surface, with the light focused on a focal point below the surface, such that the diameter of a produced spot of light on the surface is more than 40% larger than a field of view (FOV) of the light sensor, and less than 400% larger than the FOV of the light sensor;
wherein a second angle of the light reflected from the surface towards the light sensor is generally equal to the first angle;
wherein the focal point of the illumination lens is below the surface by a distance that is at least half the distance from the light sensor to the surface, but no more than 5 times the distance from the light sensor to the surface.

7. The optical sensor of claim 6 wherein a distance from the light sensor to the surface is 7.27 mm+/−0.4 mm.

8. The optical sensor of claim 7 wherein the focal point is 7.5 mm.+/−1.5 mm. below the surface.

9. The optical sensor of claim 6 wherein an irradiance roll-off on the light sensor is no more than 40%.

10. The optical sensor of claim 6 wherein the focal point is below the surface by a distance that is the same as the distance from the light sensor to the surface, plus 300% or minus 40%.

11. The optical sensor of claim 6 wherein the first angle to the surface is between 20 and 25 degrees.

12. The optical sensor of claim 6 wherein the first angle to the surface is between 22 and 24 degrees.

13. The optical sensor of claim 6 wherein the illumination lens and the imaging lens are integrated in a single piece of plastic.

14. The optical sensor of claim 6 wherein the LED is a Chip on Board (COB) LED.

15. The optical sensor of claim 6 wherein the LED is mounted in a through-hole of a first, castellated PCB and the castellated PCB is mounted over a hole of a second PCB.

16. A method for operating an optical sensor for a mouse moveable on a surface, comprising:
emitting light from an LED mounted in the mouse;
directing light with an illumination lens from the LED at a first angle to the surface;
focusing the light on a focal point below the surface, such that the diameter of a produced spot of light on the surface is more than 40% larger than a field of view (FOV) of a mouse light sensor, and less than 400% larger than the FOV of the mouse light sensor; and
focusing, with an imaging lens, light reflected from the surface on the mouse light sensor;
wherein the focal point of the illumination lens is below the surface by a distance that is at least half the distance from the mouse light sensor to the surface, but no more than 2 times the distance from the mouse light sensor to the surface.

17. The method of claim 16 further comprising:
focusing the light on a focal point below the surface, such that the focal point is below the surface by a distance below the surface corresponding to the distance from a mouse light sensor to the surface, within a range of plus 300% to minus 40%, and such that the diameter of a produced spot of light on the surface is more than 150% larger than a field of view (FOV) of a mouse light sensor, and less than 300% larger than the FOV of the mouse light sensor.

18. The method of claim 16 wherein a distance from the mouse light sensor to the surface is 7.27 mm+/−0.4 mm.

19. The method of claim 18 wherein the focal point is 7.5 mm.+/−1.5 mm. below the surface.

20. The method of claim 16 wherein an irradiance roll-off on the mouse light sensor is no more than 40%.

* * * * *